Dec. 26, 1961 R. V. GOORDMAN 3,015,071

BROADBAND AMPLIFIER USING VACUUM TUBES AND TRANSISTORS

Filed April 15, 1959 2 Sheets-Sheet 1

INVENTOR
R. V. GOORDMAN
BY E. W. Adams, Jr.
ATTORNEY

BROADBAND AMPLIFIER USING VACUUM TUBES AND TRANSISTORS

Filed April 15, 1959 2 Sheets-Sheet 2

INVENTOR
R. V. GOORDMAN
BY E. W. Adams, Jr.
ATTORNEY

United States Patent Office 3,015,071

Patented Dec. 26, 1961

3,015,071

BROADBAND AMPLIFIER USING VACUUM TUBES AND TRANSISTORS

Robert V. Goordman, Summit, N.J., assignor to Bell Telephone Laboratories, Incorporated, New York, N.Y., a corporation of New York Filed Apr. 15, 1959, Ser. No. 806,597

8 Claims. (Cl. 330—3)

This invention relates to broadband amplifiers and more particularly to arrangements for increasing the gain-bandwidth product of amplifiers including transistors.

A general objective when designing amplifiers is to obtain a maximum gain-bandwidth product for a given set of active elements. The gain-bandwidth product of an amplifier may be defined as the midband voltage gain of the amplifier multiplied by the bandwidth between half power points, i.e. between points where the power gain of the amplifier has droped three decibels from the midband gain. The ultimate gain-bandwidth product for any given active element is a constant. This is readily seen when considering, by way of example, a single stage RC coupled vacuum tube amplifier. As is commonly known, the midband gain of such an amplifier is directly proportional to the trans-conductance of the tube and the bandwidth is inversely proportional to interelectrode capacitance of the tube. Therefore, if one attempts to increase the gain by varying the circuit parameters, the bandwidth of the system is reduced, the gain-bandwidth product remaining constant for a given tube and circuit configuration. Although this effect imposes a limit for any one active element, several active elements may be combined to yield an increased overall gain-bandwidth product. One such arrangement is distributed amplification, another is stagger tuning.

Again referring to the basic problem of gain-bandwidth, it is obvious that when combining active elements, frequency response is of major importance. Therefore, it is only natural when utilizing transistors as the active elements to consider the common base amplifier configuration. Of the three basic transistor configurations, the common base presents the greatest bandwidth, i.e. the highest frequency at which the power gain has dropped three decibels from its midband value. Although the junction transistor when connected in the common base configuration possesses an excellent frequency response, the broadband voltage gain between matched terminations is less than unity. Also, for like input and output terminations, the common base transistor possesses a voltage and current gain which is substantially less than that of the same transistor when connected in the common emitter configuration and a current gain which is substantially less than that of the same transistor when connected in common collector configuration.

Other basic problems arise when junction transistors are utilized in the common base configuration. These problems are all related to the fact that for junction transistors, alpha, the short circuit transistor current amplification, is less than unity and is frequency dependent. As the frequency of the applied signal increases, alpha decreases. Since both the current and voltage gain of a transistor in common base connection are directly proportional to alpha, any resulting decreases in alpha will reduce the gain. Also, the frequency dependence of alpha has undesired effects on the input impedance of the common base transistor amplifier and therefore again on the gain. As frequency increases, thereby reducing alpha, the input impedance increases, behaving as if it contained an inductive component. Since the voltage gain of the common base transistor for any fixed collector load impedance is inversely proportional to the input impedance, increases in input impedance will result in decreases in the gain of the amplifier.

It is therefore the object of this invention to improve the gain-bandwidth product of an amplifier using a transistor as an active element.

In accordance with the above object, the essential feature of this invention lies in the use of positive feedback. Basically, the amplifier according to the invention comprises a transistor connected in common base configuration, an active positive feedback coupler and an alpha compensating network.

More specifically, according to one embodiment of the present invention, there is provided a broadband amplifier stage including a transistor having first, second, and base terminals and connected in common base configuration. Signals are applied to the first terminal of the transistor and abstracted at the second terminal. A positive feedback path is provided between the second and first terminals of the transistor. The feedback path includes a vacuum tube having its grid connected to the second terminal of the transistor, its cathode coupled to the first terminal of the transistor, and its anode connected to a source of positive potential. A circuit for shaping the positive feedback signal to compensate for transistor alpha and transistor input impedance variations with frequency is connected between the grid of the vacuum tube and a source of negative potential.

Briefly, the operation of this amplifier stage is as follows: Signal currents applied to the first terminal of the transistor produce a current at the second terminal, which is a function of alpha and the current at the first terminal. The current at the second terminal develops a voltage at the grid of the vacuum tube. This voltage produces a current in the anode-cathode circuit of the vacuum tube which is a function of the transconductance of the tube and the difference in voltage between the grid and the cathode. The signal current at the first terminal of the transistor is now equal to the sum of the applied signal current and the tube current. Therefore, for a predetermined output, the input signal current is smaller than otherwise would be required to produce a like output, and the current gain is increased. Also, in the embodiment described above, the positive feedback signal is shaped to compensate for variations in transistor alpha and transistor input impedance with frequency by an alpha compensating network connected in the feedback path, thereby overcoming the problems inherent in the use of junction transistors in the common base amplifier configuration.

As described above, the active positive feedback is utilized to increase the current and voltage gain of the transistor connected in the common base configuration to substantially that of the same transistor connected in common emitter configuration, while the feedback is shaped to maintain the broad frequency response inherent in the common base configuration. This results in a broadband amplifier having a higher gain-bandwidth product than is possible with any transistor configuration known at the present time.

The above and other features of the invention will be considered in detail in the following specification taken in connection with the drawings in which.

Figure 3:
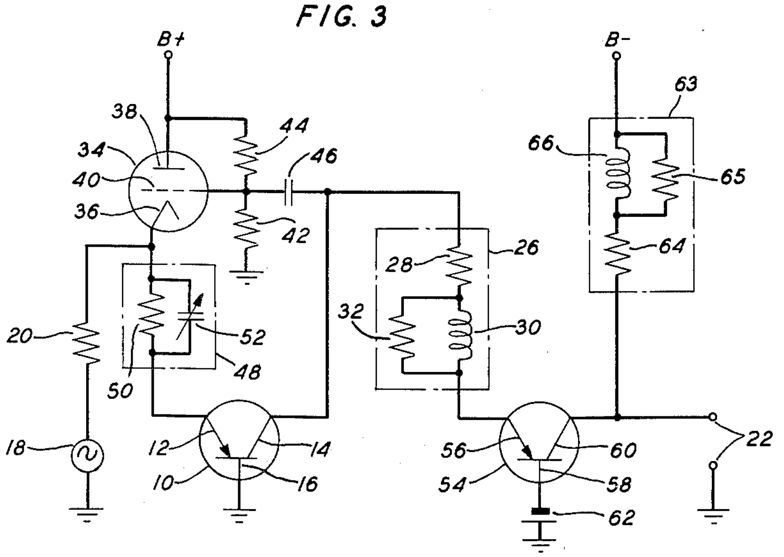
Figure 4:
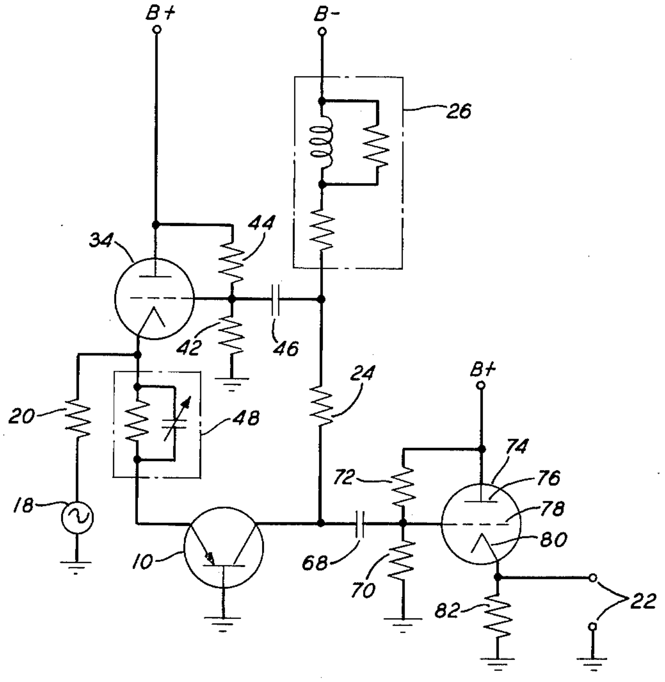
Figure 5:
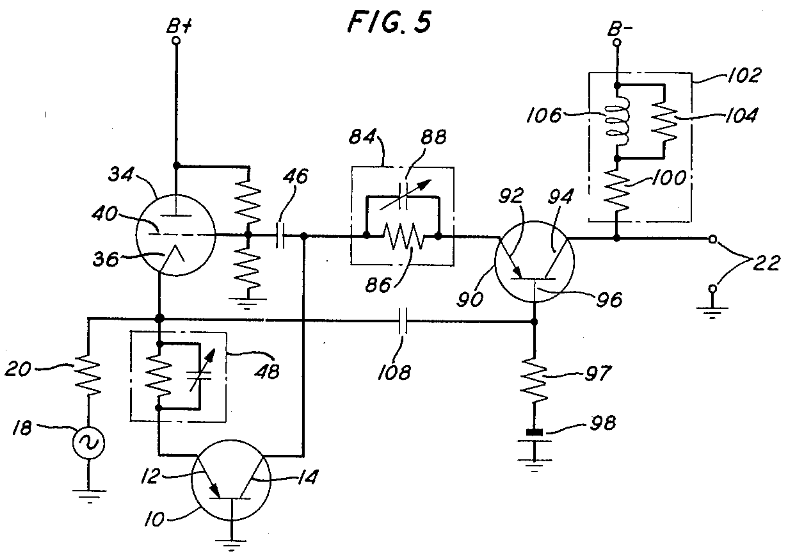

FIGS. 3, 4, and 5 are diagrams of additional amplifier circuits in accord with the principles of the present invention.

Figure 1:
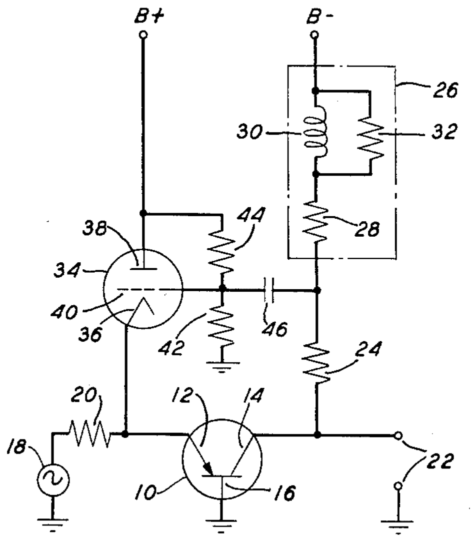
FIG. 1 is a circuit diagram of the basic amplifier stage of the invention.

Referring more particularly to the drawings, in which like parts are referred to by like reference numerals, FIG. 1 shows an amplifier stage including transistor 10 having emitter 12, collector 14, and base terminal 16, and connected in common base configuration. A signal source, indicated as a generator 18 including a series internal resistance 20, is connected between the emitter 12 and ground. This signal source could be any source of alternating voltage or the output from a prior stage of an amplifier. The collector 14 of transistor 10 is directly connected to one of output terminals 22, the other output terminal being connected to ground. Collector 14 is also connected through resistor 24 in series with alpha compensating network 26 to a source of negative potential denoted as B−.

The alpha compensating network 26 is shown, by way of example only, to comprise a resistor 28 in series with a parallel circuit consisting of coil 30 in parallel with resistor 32. A vacuum tube 34 is connected to emitter 12 of transistor 10 at its cathode 36, and connected to a source of positive potential B+ at its anode 38. The grid 40 of tube 34 is connected to ground through resistor 42, to B+ through resistor 44, and through a capacitor 46 to the junction of resistors 24 and 28. In this circuit, according to the invention, no specific characteristics are required of the transistors utilized and the only suggested requirement placed upon the vacuum tube used is that the tube be of high merit, i.e. a high ratio of transconductance to interelectrode capacitance. This will allow the amplifier to operate more efficiently at high frequencies.

In operation, signal currents applied to the emitter 12 of transistor 10, by signal source 18, produce an emitter current. The emitter current gives rise to a current at the collector which is equal to the product of alpha and the emitter current, where alpha is the short circuit transistor current amplification. The collector current develops a voltage at grid 40 of vacuum tube 34 equal to the collector current times the impedance of network 26. The grid voltage in turn produces a tube anode current which is equal to the difference between the grid voltage and the cathode voltage times the transconductance of the tube. Therefore, the applied signal current which is required to maintain a predetermined output will now be equal to the difference between the emitter current and tube current, which means that an increase in current gain over the ordinary common base transistor amplifier results. Also, the increase in current gain produces voltage gain which is greater than that of the common base transistor amplifier and approaches and may exceed that of the common emitter transistor configuration.

However, as previously discussed, both voltage and current gains are dependent upon alpha and are therefore frequency sensitive. To overcome this problem which affects both gain and input impedance, the alpha compensating network 26 is employed. Network 26 compensates for variations in alpha with frequency by providing a characteristic which compensates for the characteristic relating transistor alpha and frequency. This latter characteristic is very similar to that of a low pass RC filter. Therefore, the alpha compensator can be any network having the effect of an RL filter. In operation, the alpha compensating network shapes the positive feedback signal, and therefore the transmitted signal, by providing a path which possesses a transmission characteristic reciprocal to the alpha characteristic of the transistor, thereby extending the uniform range of output and compensating for the gain sensitivity of both alpha and the input impedance.

Figure 2:
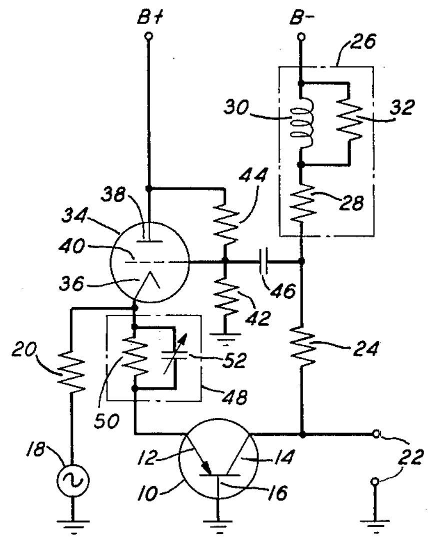
FIG. 2 is a circuit diagram of a modification of the basic amplifier stage of FIG. 1 to include two separate compensating networks.

It is to be noted that when using low quality transistors or those having a high base resistance, it may be necessary in order to maintain the high quality response made possible by the invention to provide an additional compensating network between the cathode 36 of tube 34 and emitter 12 of transistor 10. Such a circuit is shown in FIG. 2 in which the compensating network 48 includes a resistor 50 in parallel with a variable capacitor 52. Compensator network 48 aids network 26 in compensating for increases in input impedance of the amplifier with frequency. Compensating network 48 provides an impedance, which, added to the input impedance of the transistor, forms the input impedance of the amplifier. As the frequency of the applied signal is increased, the input impedance of the transistor increases, but the impedance of compensating network 48 decreases, thereby maintaining a constant input impedance for the amplifier.

FIG. 3 discloses an amplifier according to the invention and including a transistor output stage coupled to a simple modification of the amplifier stage disclosed in FIG. 2. In this embodiment, a transistor 54 functions as the output stage and produces a constant current output characteristic for the amplifier. Transistor 54 is connected by its emitter 56 to alpha compensator 26, by base 58 through biasing battery 62 to ground, and by its collector 60 directly to the ungrounded one of output terminals 22 and also through a second alpha compensating network 63 to a source of negative potential B−. Network 63 includes resistor 64 in series with a parallel circuit consisting of inductor 66 and resistor 65 and functions as previously described in connection with FIG. 1 to compensate for alpha variations with frequency in transistor 54. In operation, the output current from transistor 10, which is produced as described in the discussion relating to FIG. 1, passes through alpha compensator 26 to emitter 56. This in turn produces a current at the collector 60 of transistor 54, which passes through network 63 and produces an output signal at terminals 22.

The outstanding feature of this embodiment is that in utilizing a transistor in the output stage not only does one isolate a load from the previous stage, but one is able to take advantage of the inherent problem of increasing input impedance with frequency in common base transistor configurations. As described in connection with FIG. 1, the current applied to transistor 10 by vacuum tube 34 is a function of the grid-cathode voltage; therefore, as frequency increases and the input impedance of transistor 10 rises, the grid-cathode voltage decreases, resulting in a reduced current and voltage gain. When utilizing transistor 54 in the output stage as shown in FIG. 3, increasing frequency produces an increase in the input impedance of transistor 54. If transistor 10 and transistor 54 possess like characteristics, the input impedance of transistor 54 will increase at the same rate as transistor 10. Therefore, as the input impedance of transistor 10 tends to reduce the grid-cathode voltage of vacuum tube 34, the input impedance of transistor 54, which is effectively in series with network 26, produces an increase in the grid-cathode voltage, and as a result, the resultant grid-cathode signal voltage remains constant and a constant gain with frequency is obtained.

FIG. 4 shows an amplifier stage as disclosed in FIG. 2 connected to an output or interstage coupler including a cathode follower vacuum tube. In this embodiment, the collector of transistor 10 is coupled through capacitor 68 to grid 78 of vacuum tube 74. Grid 78 is also connected through resistor 72 to a source of positive potential B+ and through resistor 70 to ground. The anode 76 of vacuum tube 74 is directly connected to B+ and the cathode 80 is directly connected to the ungrounded one of terminals 22 and through the resistor 82 to ground. This embodiment of the invention is utilized when a constant voltage output or an interstage current gain is desired. As is commonly known, the cathode follower is a voltage-operated device; therefore, the output voltage of transistor 10, which is applied to the grid 78 of vacuum tube 70, produces a substantially equal cathode voltage. This means that for reasonably large variations in the value of the cathode resistor 82 or of the terminating impedance of the amplifier, a substantially constant voltage output will be obtained. Also, when utilizing a cathode follower as an interstage coupler, one can obtain an interstage current gain. This is accomplished by using a cathode impedance which is less than the impedance at the grid of the vacuum tube.

FIG. 5 shows a modification of the basic amplifier circuit described in connection with FIG. 3. In this embodiment, collector 14 of transistor 10 is connected through a frequency compensating network 84 to emitter 92 of a transistor 90. Frequency compensating network 84 includes, by way of example only, a resistor 86 in parallel with a variable capacitor 88. The collector 94 of transistor 90 is connected to the ungrounded one of output terminals 22 and also through an alpha compensating network 102 to a source of negative potential B—. Network 102 includes resistor 100 in series with a parallel circuit consisting of inductor 104 and resistor 106 and functions as previously described in connection with FIG. 1 to compensate for alpha variations with frequency in transistor 90. The base 96 of transistor 90 is connected through a resistor 97 in series with a biasing battery 98 to ground and through a capacitor 108 to emitter 12 of transistor 10.

The outstanding feature of this embodiment is the effect produced by coupling the base 96 of transistor 90 through capacitor 108 to the cathode 36 of vacuum tube 34. The connection eliminates the effect of variations in the input impedance of transistor 10 upon the grid-cathode voltage of vacuum tube 34, and therefore upon the current gain of the amplifier by allowing any changes in voltage at emitter 12 to have a like effect at the base 96 of transistor 90. If the input impedance of transistor 10 should vary and produce a variation in the emitter voltage of transistor 10, a like variation would occur in the base voltage of transistor 90, thereby eliminating the variation in grid-cathode voltage which would otherwise occur. Therefore, in this embodiment, the grid-cathode voltage is entirely a function of the input impedance of transistor 90, the alpha of transistor 10, and impedance of the frequency compensating network 84. As the frequency of the applied signal increases, the input impedance of transistor 90 increases and the impedance of the frequency compensating network 84 decreases. The sum of these two impedances can be adjusted, by varying the value of capacitor 88 so that the resultant impedance increases at the same rate that transistor alpha decreases (which normally reduces the emitter to collector current transfer in transistor 10) and thereby maintains a constant current through the collector of transistor 10 and a constant current gain for the amplifier.

What is claimed is:

1. A broadband amplifier comprising in combination a source of potential having a positive and a negative terminal, a transistor having emitter, collector, and base terminals, and connected in common base configuration, means for applying a signal to said emitter terminal, a positive feedback path between said collector terminal and said emitter terminal, said feedback path including a vacuum tube having at least cathode, grid, and anode elements, said grid being connected to said collector terminal, said cathode being connected to said emitter terminal, and said anode being connected to the positive terminal of said source of potential, means connected between said grid of said vacuum tube and said negative terminal for shaping the positive feedback signal to compensate for transistor alpha and transistor input impedance variations with frequency, and means for deriving an output from said transistor.

2. A broadband amplifier as defined in claim 1 wherein the shaping means includes a shunt peaking network consisting of a coil in parallel with a resistor.

3. A broadband amplifier comprising in combination a source of potential having a positive and a negative terminal, a transistor having emitter, collector, and base terminals, and connected in common base configuration, means for applying a signal to said emitter, a positive feedback path between said collector terminal and said emitter terminal, said feedback path including a vacuum tube having at least cathode, grid, and anode elements, said grid being connected to said collector terminal, said cathode being connected to said emitter terminal and said anode being connected to the positive terminal of said source of potential, means connected between said grid of said vacuum tube and the negative terminal of said source of potential for shaping the positive feedback signal to compensate for transistor alpha variations with frequency, passive means connected between said cathode and said emitter terminal for compensating for variations in transistor input impedance with frequency, and means for deriving an output from said transistor.

4. A broadband amplifier as defined in claim 3 wherein said compensating means includes a network consisting of a variable capacitor in parallel with the resistor.

5. A broadband amplifier as defined in claim 3 wherein said means for deriving an output from said transistor includes a second transistor having emitter, collector, and base terminals and connected in common base configuration, said last-named emitter connected to said shaping means and said last-named collector connected to the negative terminal of said source of potential, thereby allowing variations in input impedance with frequency of said second transistor configuration to aid in compensating for variations in input impedance of said amplifier.

6. A broadband amplifier as defined in claim 3 wherein said means for deriving an output from said transistor includes a second vacuum tube connected as a cathode follower and having its grid connected to the collector of said transistor, thereby allowing a constant voltage output to appear at the cathode of said second tube for variations in terminating impedance of said amplifier.

7. A broadband amplifier comprising in combination a source of potential having a positive and a negative terminal, a first transistor having emitter, collector, and base terminals and connected in common base configuration, means for applying a signal to said emitter terminal, a positive feedback path between said collector terminal and said emitter terminal, said feedback path including a vacuum tube having at least cathode, grid, and anode elements, said grid being connected to said collector terminal, said cathode being connected to said emitter terminal, and said anode being connected to the positive terminal of said source of potential, means connected between said grid of said vacuum tube and the negative terminal of said source of potential for shaping the positive feedback signal to compensate for transistor alpha variations with frequency, passive means connected between said cathode and said emitter terminal for compensating for variations in transistor input impedance with frequency, means for deriving an output from said first transistor, said means for deriving an output being included in said shaping means and comprising a passive frequency compensating network connected to the collector of said first transistor, a second transistor having emitter, collector, and base terminals, said last-named emitter being connected to said frequency compensating network and said last-named collector being connected to the negative terminal of said source of potential, a biasing battery in series with a resistor connected between said base terminal and ground, means for coupling the base of said transistor to the cathode of said vacuum tube, and means for deriving an output signal at the collector of said second transistor.

8. A broadband amplifier as defined in claim 7 wherein said frequency compensating network includes a parallel combination of a resistor and a variable capacitor.

References Cited in the file of this patent

UNITED STATES PATENTS

| | | |
|---|---|---|
| 2,691,074 | Eberhard | Oct. 5, 1954 |
| 2,704,792 | Eberhard et al. | Mar. 22, 1955 |
| 2,866,858 | Sziklai | Dec. 30, 1958 |
| 2,909,623 | Blecher | Oct. 20, 1959 |

FOREIGN PATENTS

| | | |
|---|---|---|
| 150,232 | Australia | Feb. 23, 1953 |